US006914892B1

(12) United States Patent
Cooper et al.

(10) Patent No.: US 6,914,892 B1
(45) Date of Patent: Jul. 5, 2005

(54) ARRANGEMENT FOR TESTING NETWORK SWITCH EXPANSION PORT DATA BY CONVERTING TO MEDIA INDEPENDENT INTERFACE FORMAT

(75) Inventors: Melissa D. Cooper, Mountain View, CA (US); Robert James Thompson, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 853 days.

(21) Appl. No.: 09/770,200

(22) Filed: Jan. 29, 2001

(51) Int. Cl.[7] .............................. H04Q 7/24; G01R 31/28
(52) U.S. Cl. ..................... 370/338; 370/401; 370/467; 709/230; 709/250; 714/742
(58) Field of Search .................. 370/338, 401–404, 370/465–467; 709/223–224, 229–230, 250; 714/3–4, 30–31, 44–47, 724, 742

(56) References Cited

U.S. PATENT DOCUMENTS

| | | | | |
|---|---|---|---|---|
| 5,828,824 A | * | 10/1998 | Swoboda ..................... | 714/25 |
| 5,953,335 A | | 9/1999 | Erimli et al. | |
| 6,125,416 A | * | 9/2000 | Warren ........................ | 710/71 |
| 6,175,914 B1 | * | 1/2001 | Mann .......................... | 712/227 |
| 6,208,904 B1 | * | 3/2001 | Mullen, Jr. .................. | 700/9 |
| 6,222,855 B1 | * | 4/2001 | Kimber et al. ............... | 370/466 |
| 6,483,342 B2 | * | 11/2002 | Britton et al. ................. | 326/39 |
| 6,567,932 B2 | * | 5/2003 | Edwards et al. .............. | 714/30 |
| 6,587,911 B1 | * | 7/2003 | Kawamura et al. .......... | 710/315 |
| 6,601,200 B1 | * | 7/2003 | Delp et al. ................... | 714/724 |
| 6,665,737 B2 | * | 12/2003 | Edwards ........................ | 710/3 |
| 6,718,397 B1 | * | 4/2004 | Zhao ........................... | 709/250 |

* cited by examiner

*Primary Examiner*—Zarni Maung
*Assistant Examiner*—Van Nguyen
(74) *Attorney, Agent, or Firm*—Manelli Denison & Selter PLLC; Leon R. Turkevich

(57) ABSTRACT

A method for testing a network switch chip having an expansion port configured for transferring data according to a prescribed expansion port protocol. The method includes outputting the expansion port frame data from the expansion port according to the prescribed expansion port protocol, converting the expansion port frame data from the prescribed expansion port protocol to a prescribed network protocol such as IEEE 802.3-based Media Independent Interface (MII) protocol, and outputting the converted data according to the prescribed MII protocol to a test device having an MII interface configured for receiving the data according to the prescribed MII protocol. The conversion of the data from the prescribed expansion port protocol to the prescribed MII protocol enables the use of the test device for validation of the expansion port, without the necessity of another network switch chip.

10 Claims, 3 Drawing Sheets

ARRANGEMENT FOR TESTING NETWORK SWITCH EXPANSION PORT DATA BY CONVERTING TO MEDIA INDEPENDENT INTERFACE FORMAT

BACKGROUND OF THE INVENTION

1. Field of the Invention

The present invention relates to the testing of network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks such as Ethernet (IEEE 802.3) based systems are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes. Hence, network switch designers and test engineers need to be able to minimize the time and expense needed to evaluate designs during prototyping of Ethernet-based network systems.

One problem associated with testing network-based switch chips involves the limited availability of the sample chips for testing hardware associated with interaction between multiple chips. For example, the network switch disclosed in U.S. Pat. No. 5,953,335 describes an expansion port that may be used for interconnecting multiple network switch chips for transfer of packet data according to a prescribed bus protocol, such as peripheral component interconnect (PCI) bus protocol. However, use of the expansion port assumes the availability of at least one additional network switch chip for interconnection of the expansion ports of the respective network switch chips.

Hence, there is a concern that the expansion port and associated operations cannot be tested or validated if only one network switch chip is available for testing. In addition, even if a second network switch chip was available for testing of the expansion ports, a detected error between the expansion port operations creates the additional problem of determining whether the detected error is due to a problem in the first switch chip under test, a problem in the second switch chip used for testing the expansion port of first switch chip, a problem in the connection between the two expansion ports, or any combination of the foregoing.

SUMMARY OF THE INVENTION

There is a need for an arrangement that enables an expansion port of a network switch chip, configured for transferring data according to a prescribed bus protocol, to be tested and evaluated without the necessity of a second switch chip.

This and other needs are attained by the present invention, where a network switch chip having an expansion port configured for transferring data according to a prescribed bus protocol is tested using test equipment and a converter. The test equipment includes a media independent interface (MII) configured for sending and receiving data according to a prescribed network protocol, and a converter is configured for converting data between the prescribed bus protocol and the prescribed network protocol. Hence, the expansion port of the network switch chip can be tested without the necessity of a second network switch chip.

One aspect of the present invention provides a method for testing a network switch chip having an expansion port configured for transferring data according to a prescribed protocol. The method includes outputting the data from the expansion port according to the prescribed protocol, converting the data from the prescribed protocol to a prescribed network protocol, and outputting the data according to the prescribed network protocol to a test device having an interface configured for receiving the data according to the prescribed network protocol. The conversion of the data from the prescribed protocol to the prescribed network protocol enables the use of the test device for validation of the expansion port, without the necessity of another network switch chip.

Another aspect of the present invention provides a test system configured for testing a network switch chip having an expansion port configured for transferring data according to a prescribed protocol. The test system includes a test device configured for outputting and receiving data according to a media independent interface (MII) protocol, and a converter. The converter is configured for converting the data between the MII protocol utilized by the test device and the prescribed protocol utilized by the expansion port, enabling communication between the expansion port and the test device. Hence, the expansion port of the network switch chip can be tested without the necessity of a second switch chip having a corresponding expansion port.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
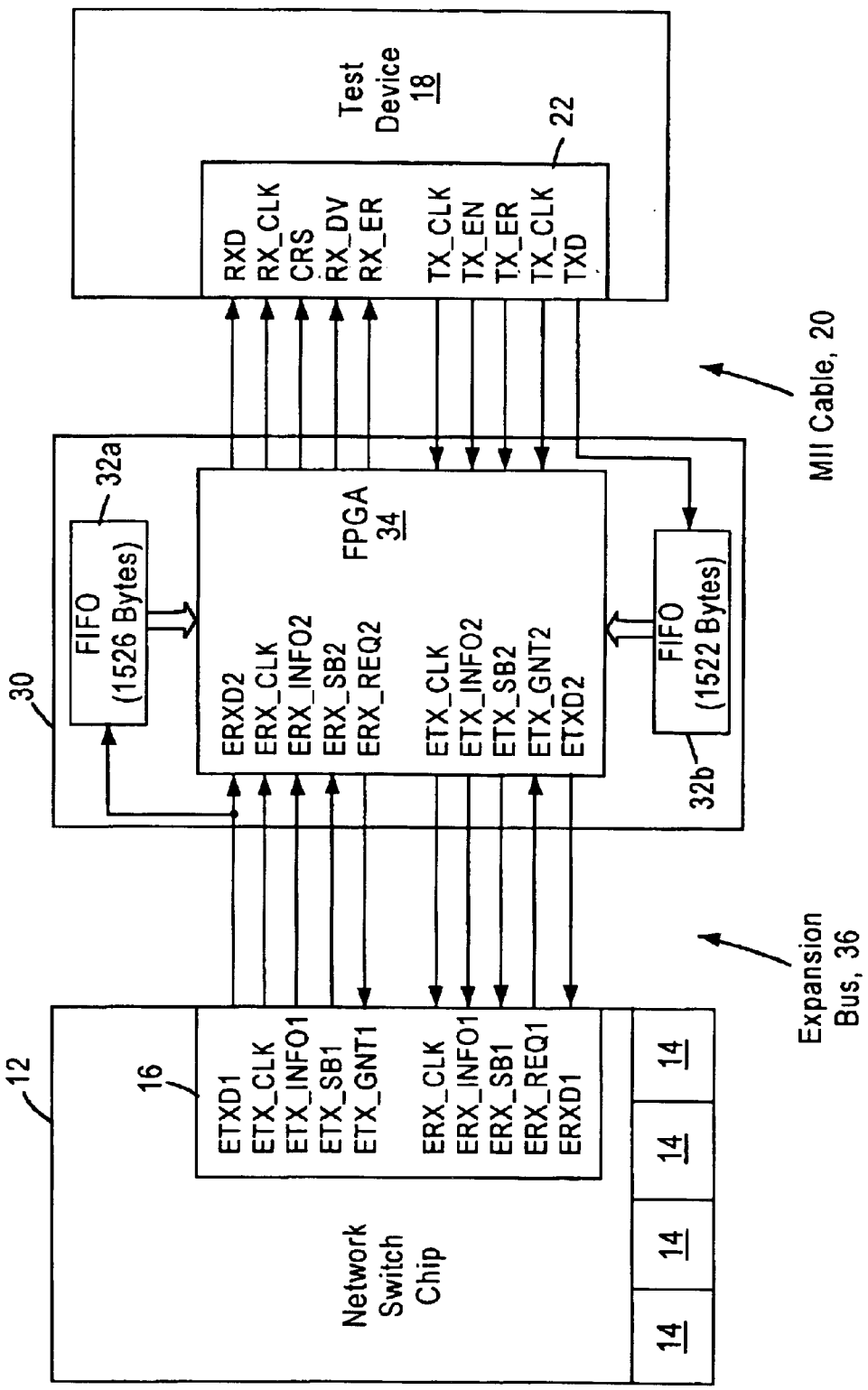
FIG. 1 is a block diagram of a system configured for testing an expansion port of a network switch chip according to an embodiment of the present invention.
Figure 2A:
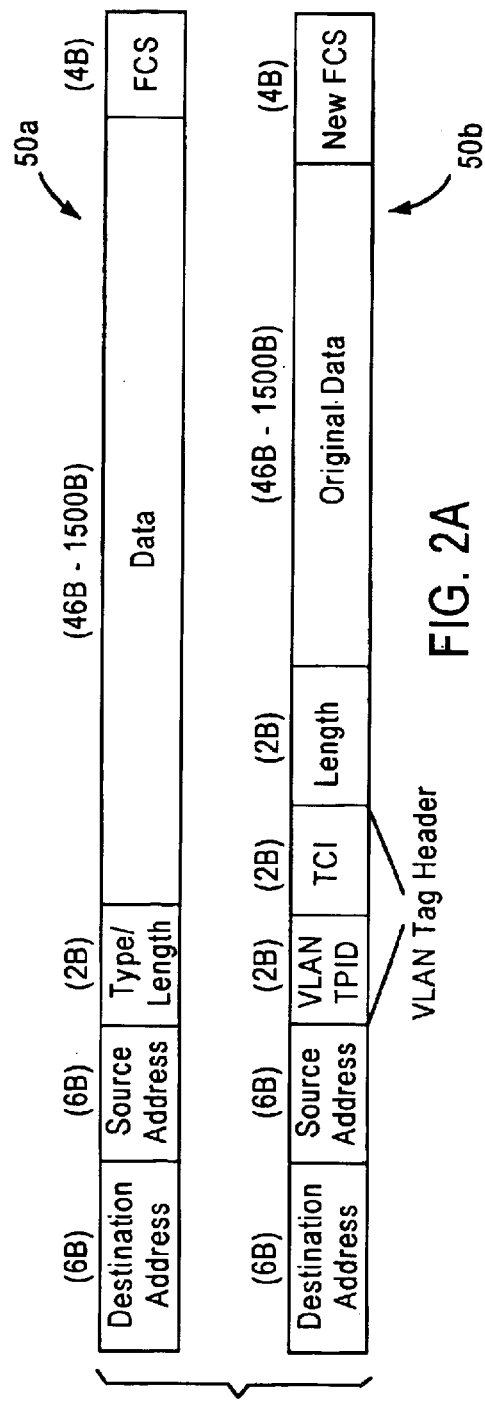
FIGS. 2A and 2B are diagrams illustrating IEEE 802.3-based media independent interface (MII) protocol data frames and an expansion port protocol frame, respectively.

FIG. 1 is a block diagram illustrating a testing system 10 configured for testing a network switch chip 12, for example an integrated network switch as illustrated in U.S. Pat. No. 5,953,335, according to an embodiment of the present invention. In particular, the network switch chip 12 includes network switch ports 14 configured for sending and receiving data frames 50, illustrated in FIG. 2A, according to a prescribed network protocol, such as IEEE 802.3-based Media Independent Interface (MII) protocol. The network switch 14 also includes an expansion port 16 configured for transferring data 52, also referred to as expansion port frames, between other switch chips via their respective switch ports according to a prescribed protocol, for example a burst-based bus protocol.

The testing system 10 also includes a test device 18 configured for outputting and receiving data frames 50 according to the IEEE 802.3-based MII protocol. In particular, the test device 18 is configured for sending and receiving data packets 50 across an MII cable 20 to Ethernet-based (IEEE 802.3) devices under test in accordance with prescribed test operations via a MII connection 22. As described above, the MII connection 22 could be directly connected to any one of the network switch ports 14, however the expansion port 16 cannot be tested solely using the MII connection 22 and MII cable 20.

According to the disclosed embodiment, the test system 10 includes a converter 30 configured for converting the data between the MII protocol (e.g., data frames 50), utilized by the MII connection 22 of the test device 18, and the burst-based bus protocol (e.g., expansion port frames 52) utilized by the expansion port 16. Hence, the converter 30 enables communication between the expansion port 16 and the test device 18.

Figure 2B:
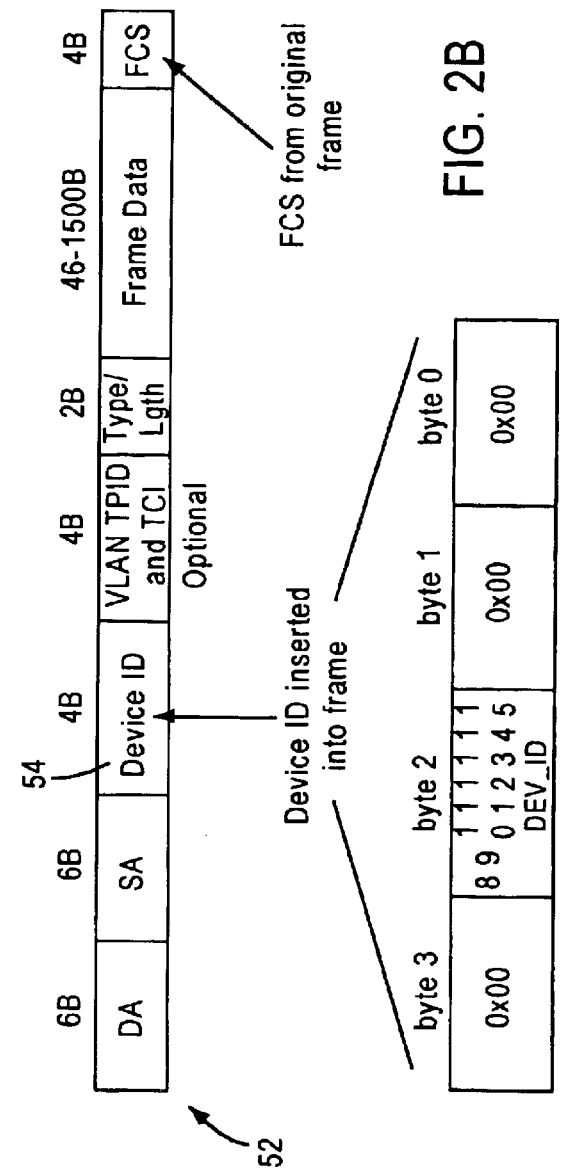

The converter 30, implemented for example using a PC board, includes first-in first-out (FIFO) buffers 32a and 32b, and a field programmable gate array (FPGA) 34. The FIFO buffers 32 are configured for storing at least one maximum-sized frame; in particular, the FIFO 32a is configured for storing at least the maximum size of the expansion port frame 52 (e.g., 1526 bytes) illustrated in FIG. 2B, and the FIFO 32b is configured for storing at least the maximum sized IEEE 802.3 frame; since the FIFO 32b can receive either an untagged frame 50a or a tagged frame 50b, the FIFO 32b is configured for receiving at least the maximum size of the larger tagged frame 50b (e.g., 1522 bytes). The field programmable gate array 34 is configured for converting between the expansion port frame data and the IEEE 802.3 frame, described below.

Figure 3A:
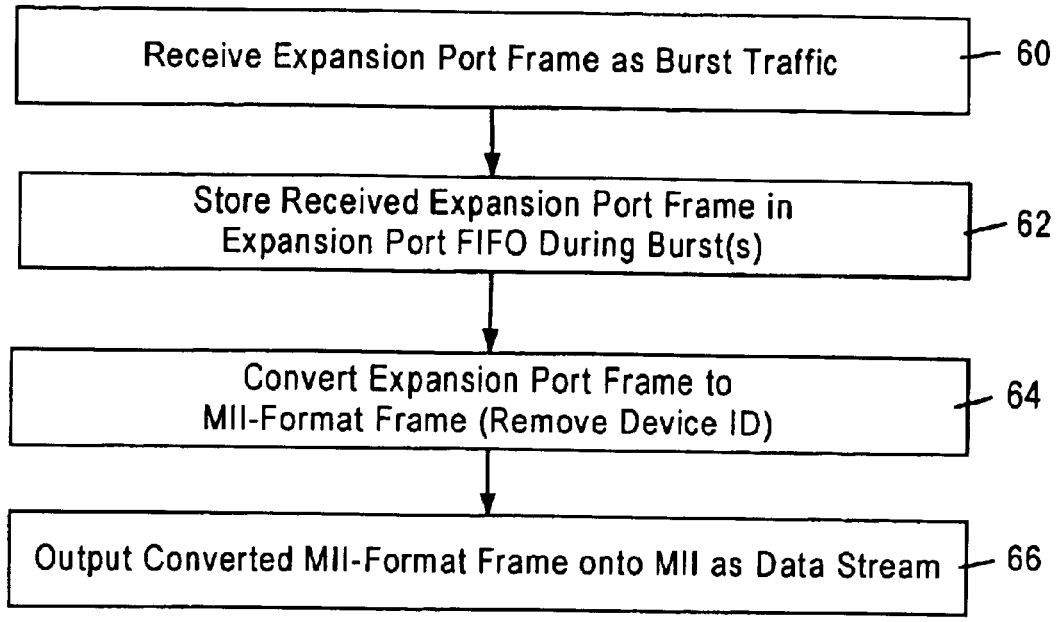
FIGS. 3A and 3B are diagrams summarizing testing methods including converting and outputting data from an expansion port format to an MII format, and from an MII format to an expansion port format, respectively, according to an embodiment of the present invention.

FIG. 3A is a diagram illustrating the method of testing the network switch chip according to an embodiment of the present invention. The method begins in step 60, where the converter 30 receives the expansion port frame as burst traffic and stores in step 62 the burst traffic (as an expansion port frame) in the FIFO 32a In particular, data is transferred over the expansion bus 36 on the expansion port transmit data path (ETXD1) in bursts of eight clock (ETX_CLK= ERX_CLK) cycles; the data includes start and end of frame information as well as frame data. As described above, the expansion port data also includes the device ID field 54 illustrated in FIG. 2B.

The FPGA 34 asserts the expansion port receiver request signal (ERX_REQ2) until detecting that the FIFO 32a is full. Hence, the expansion port 16 continues to transmit data so long as the expansion port receiver request (ETX_REQ2) signal (i.e., the expansion port transmit grant (ETX_GNT1) input) is asserted by the FPGA 34; in other words, the expansion port 16 continues to transmit data as long as the expansion port transmit grant (ETX_GNT1) input is asserted. Control information such as start and stop markers that correspond to data, is supplied by the expansion port 16 on the expansion port control data lines (ETX_INFO1, ERX_INFO2). The expansion port transit start of burst (ETX_SB1) is used by the expansion port 16 to indicate to the FPGA 34 on the expansion port receive start of burst (ERX_SB2) input that valid data will be presented on the expansion port transmit data (ETXD1) path for a burst of eight clock cycles.

Once a fill expansion port frame 52 has been stored in the expansion port FIFO 32a, the FPGA 34 converts in step 64 the expansion port frame 52 into an IEEE 802.3-based MII format frame 50 by removing the device identifier field 54. The FPGA 34 then outputs in step 66 the converted MII-format frame onto the MII cable 20 as a serial data stream. As illustrated in FIG. 1, the FPGA 34 acts as a physical layer transceiver for the MII Interface 22 by outputting the data on a receive data path (RXD) based on a receive clock (RX_CLK) signal, and by asserting carrier sense (CRS) and data valid (RX_DV) signals. If an error is detected by the FPGA 34 in the received expansion port frame 52, the FPGA 34 may output an error signal (RX_ER) on the MII cable 20.

Figure 3B:
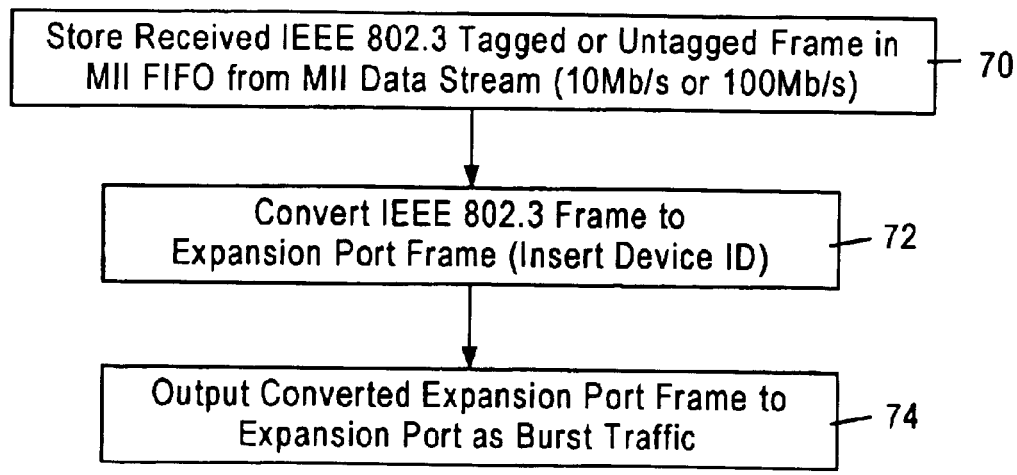

FIG. 3B is a diagram illustrating the method of testing the expansion port 16 by converting an IEEE 802.3 frame 50, received from the MII interface 22, into an expansion port frame 52 for transfer to the expansion port 16 according to an embodiment of the present invention. The MII FIFO 32b stores in step 70 the IEEE 802.3 frame 50, received on the transmit data (TXD) path based on the transmit clock (TX_CLK) signal and the transmit enable (TX_EN) signal. Transmit errors are indicated by the test equipment MII interface 22 outputting the transmit error (TX_ER) signal onto the MII cable 20.

The FPGA 34 converts in step 72 the stored IEEE 802.3 frame 50 into an expansion port frame 52 by inserting a device identifier field 54 having a prescribed value. The FPGA 34 then outputs in step 74 the converted expansion port frame onto the expansion port bus 36 for reception by the expansion port 16. In particular, the FPGA 34 waits until the expansion port receiver request signal (ETX_REQ1) is asserted by the expansion port 16. The FPGA 34 continues to transmit data so long as the expansion port receiver request (ETX_REQ1) signal (i.e., the expansion port transmit grant (ETX_GNT2) input) is asserted by the expansion port 16. Control information such as start and stop markers that correspond to data, is supplied by the FPGA 34 on the expansion port control data lines (ETX_INFO2, ERX_INFO1). The expansion port transmit start of burst (ETX_SB2) is used by the FPGA 34 to indicate to the expansion port 16 on the expansion port receive start of burst (ERX_SB1) input that valid data will be presented on the expansion port transmit data (ETXD2) path for a burst of eight clock cycles (ETX_CLK and ERX_CLK).

According to the disclosed embodiment, an expansion port of a network switch chip is tested using a test device having an MII interface by converting the data from the expansion port format to the MII interface format, and outputting the converted data according to the corresponding transmission format Hence, the expansion port can be tested without the necessity of a second network switch chip; in addition, testing of the expansion port using the disclosed arrangement improves testing integrity by eliminating the possibility of failures in a second network switch chip adversely affecting testing of the expansion port of the device under test.

Although the disclosed arrangement describes conversion to a media independent interface, the expansion port data also may be converted to a reduced media independent interface (RMII) format according to the RMII™ Specification, Revision 1.2.

While this invention has been described with what is presently considered to be the most practical preferred embodiment, it is to be understood that the invention is not limited to the disclosed embodiments, but on the contrary, is intended to cover various modifications and equivalent arrangements included within the spirit and scope of the appended claims.

What is claimed is:

1. A method for testing a network switch chip having an expansion port configured for transferring data according to a prescribed protocol, the method comprising:

first outputting the data from the expansion port according to the prescribed protocol;

converting the data from the prescribed protocol to a prescribed network protocol; and second outputting the data according to the prescribed network protocol to a test device having an interface configured for receiving the data according to the prescribed network protocol, wherein:

the prescribed protocol and the prescribed network protocol specify transfer of data at respective first and second data rates, the converting step including buffering the data between the first and second data rates;

the first outputting step includes outputting the data according to the prescribed protocol using a burst-type transmission;

the second outputting step includes outputting the data according to the prescribed network protocol using a stream-type transmission; and the buffering step includes buffering the data between the burst-type transmission and the stream-type transmission.

2. The method of claim 1, wherein:

the prescribed protocol corresponds to a burst-based bus protocol; and the prescribed network protocol corresponds to IEEE 802.3-based media independent interface (MII) protocol.

3. A method for testing a network switch chip having an expansion port configured for transferring data according to a prescribed protocol, the method comprising:

first outputting the data from the expansion port according to the prescribed protocol;

converting the data from the prescribed protocol to a prescribed network protocol; and second outputting the data according to the prescribed network protocol to a test device having an interface configured for receiving the data according to the prescribed network protocol, wherein the converting step includes:

buffering the data output by the expansion port into a first first-in first-out (FIFO) buffer; and converting the data in the first FIFO buffer using a field programmable gate array (FPGA) for transmission according to the prescribed network protocol.

4. The method of claim 3, wherein the first FIFO buffer is configured for storing at least one maximum size data frame according to the prescribed protocol.

5. A method for testing a network switch chip having an expansion port configured for transferring data according to a prescribed protocol, the method comprising:

first outputting the data from the expansion port according to the prescribed protocol;

converting the data from the prescribed protocol to a prescribed network protocol;

second outputting the data according to the prescribed network protocol to a test device having an interface configured for receiving the data according to the prescribed network protocol, wherein the prescribed protocol and the prescribed network protocol specify transfer of data at respective first and second data rates, the converting step including buffering the data between the first and second data rates;

third outputting second data from the test device according to the prescribed network protocol;

converting the second data from the prescribed network protocol to the prescribed protocol; and fourth outputting the second data according to the prescribed protocol to the expansion port.

6. The method of claim 5, wherein:

the third outputting step includes outputting the second data according to the prescribed network protocol using a stream-type transmission;

the fourth outputting step including outputting the second data according to the prescribed protocol using a burst-type transmission; and the second data converting step including buffering the second data between the stream-type transmission and the burst-type transmission.

7. The method of claim 6, wherein:

the prescribed protocol corresponds to a burst-based bus protocol; and the prescribed network protocol corresponds to IEEE 802.3-based media independent interface (MII) protocol.

8. A test system for testing a network switch chip having an expansion port configured for transferring data according to a prescribed protocol, the system comprising:

a test device configured for outputting and receiving data according to a media independent interface (MII) protocol; and a converter configured for converting the data between the MII protocol utilized by the test device and the prescribed protocol utilized by the expansion port for communication between the expansion port and the test device;

wherein the converter includes:

a first first-in first-out (FIFO) buffer configured for receiving the data from the test device according to the MII protocol based on a stream-type transmission;

a second FIFO configured for receiving second data from the expansion port according to the prescribed protocol according to a burst-type transmission; and a field programmable gate array configured for outputting the data stored in the first FIFO according to the prescribed protocol using the burst-type transmission, and outputting the second data stored in the second FIFO according to the MII protocol according to a stream-type transmission.

9. The system of claim 8, wherein:

the prescribed protocol corresponds to a burst-based bus protocol; and the prescribed network protocol corresponds to IEEE 802.3-based media independent interface (MII) protocol.

10. The system of claim 8, wherein the first and second FIFOs are configured for storing at least one maximum-size IEEE 802.3-based data packet and at least one maximum-size expansion port frame according to the prescribed protocol, respectively.

* * * * *